US009303627B2

(12) United States Patent
Romo et al.

(10) Patent No.: US 9,303,627 B2
(45) Date of Patent: Apr. 5, 2016

(54) GUIDE WIRE TENSION LOSS SENSOR

(71) Applicant: SafeWorks, LLC, Tukwila, WA (US)

(72) Inventors: David Arevalo Romo, Bonney Lake, WA (US); John Jerome Haigh, Menomonee Falls, WI (US)

(73) Assignee: Safeworks, LLC, Tukwila, WA (US)

( * ) Notice: Subject to any disclaimer, the term of this patent is extended or adjusted under 35 U.S.C. 154(b) by 0 days.

(21) Appl. No.: 14/391,687

(22) PCT Filed: Jan. 24, 2014

(86) PCT No.: PCT/US2014/013072
§ 371 (c)(1),
(2) Date: Oct. 9, 2014

(87) PCT Pub. No.: WO2014/120578
PCT Pub. Date: Aug. 7, 2014

(65) Prior Publication Data

US 2015/0075295 A1 Mar. 19, 2015

Related U.S. Application Data

(63) Continuation of application No. 13/758,343, filed on Feb. 4, 2013, now abandoned.

(51) Int. Cl.

| | |
|---|---|
| ***G01L 5/04*** | (2006.01) |
| ***F03D 11/00*** | (2006.01) |
| ***B66B 7/02*** | (2006.01) |
| ***B66B 7/12*** | (2006.01) |
| ***F03D 1/00*** | (2006.01) |
| ***G01L 5/00*** | (2006.01) |
| *G01L 5/10* | (2006.01) |

(Continued)

(52) U.S. Cl.
CPC .............. *F03D 11/005* (2013.01); *B66B 7/025* (2013.01); *B66B 7/1246* (2013.01); *F03D 1/003* (2013.01); *G01L 5/0057* (2013.01); *G01L 1/04* (2013.01); *G01L 1/22* (2013.01); *G01L 5/04* (2013.01); *G01L 5/108* (2013.01); *Y02E 10/72* (2013.01)

(58) Field of Classification Search
CPC ............. G01L 5/108; G01L 5/04; G01L 1/04; G01L 1/22
USPC ................... 73/860, 826, 831, 833, 856, 786, 73/862.391, 862.41, 862.01, 862.42; 187/239, 393, 412; 254/272
See application file for complete search history.

(56) References Cited

U.S. PATENT DOCUMENTS 3,859,593 A * 1/1975 Poole et al. .................. 324/454
3,887,038 A * 6/1975 Buschbom et al. ........... 187/259
4,106,594 A * 8/1978 Kirsch .................... B66B 5/022 187/278

(Continued)

FOREIGN PATENT DOCUMENTS

CN 201002900 Y * 1/2008
JP 53116653 A * 10/1978

(Continued)

*Primary Examiner* — Lisa Caputo
*Assistant Examiner* — Jonathan Dunlap
(74) *Attorney, Agent, or Firm* — Baker & Hostetler LLP

(57) ABSTRACT

Systems and devices are described for measuring tension in a guide wire in a tower service lift for ascending and descending wind turbine generator towers. The present disclosure also describes methods for measuring the tension in the guide wire as well as installing a device for measuring the tension in the guide wire.

12 Claims, 6 Drawing Sheets

4
6
22
16
20
14
18
24
26

(51) Int. Cl.
*G01L 1/22* (2006.01)
*G01L 1/04* (2006.01)

(56) References Cited

U.S. PATENT DOCUMENTS 5,454,272 A * 10/1995 Miller ..................... G01L 5/042 73/862.391
5,731,528 A 3/1998 Yamazaki et al.
6,123,176 A 9/2000 O'Donnell et al.
7,313,975 B1 * 1/2008 Scorteanu ................ 73/862.454
7,317,261 B2 * 1/2008 Rolt ................................ 290/55
8,013,619 B2 * 9/2011 Olson et al. ................... 324/722
8,162,110 B2 * 4/2012 Smith ................... B66B 1/3484 187/266
8,640,895 B2 * 2/2014 Pleuss et al. .................. 212/276
8,692,679 B2 * 4/2014 Brickell ........................ 340/635
2009/0169380 A1 * 7/2009 Nies ........................ E02D 33/00 416/61
2009/0173573 A1 7/2009 Teichert
2009/0294219 A1 12/2009 Oliphant et al.
2011/0253484 A1 10/2011 Berner
2011/0266096 A1 11/2011 Nies
2013/0183133 A1 * 7/2013 Munk-Hansen ......... B66D 1/36 414/800
2014/0103665 A1 * 4/2014 Von Grunberg ...... F03D 11/045 D11/45
2015/0166305 A1 * 6/2015 Kalliomaki ............. B66B 7/064 187/254

FOREIGN PATENT DOCUMENTS

JP 3736365 B2 * 1/2006
KR 20120115040 A * 10/2012

* cited by examiner

GUIDE WIRE TENSION LOSS SENSOR

CROSS-REFERENCE TO RELATED APPLICATIONS

This application is the National Stage of International Application No. PCT/US2014/013072 filed Jan. 24, 2014, which claims the benefit of U.S. patent application Ser. No. 13/758,343 filed Feb. 4, 2013, the disclosures of which are incorporated herein by reference in their entireties.

BACKGROUND OF THE INVENTION

Renewable energies such as solar energy are becoming an increasingly significant technology. Solar energy manifests in many different forms, one of which is wind energy that can be captured by wind turbines. Wind turbines employ blades or rotors that are aligned with the wind and turn when the wind passes over the blades. The turning blades in turn power a generator that effectively converts the potential energy of wind into electrical energy. Wind turbines commonly include a rotor having multiple blades that are mounted to a housing or nacelle that is positioned on top of a truss or tubular tower. In addition to the blade or rotor, a turbine also includes a drive train that typically includes a gearbox and a generator, a tower that supports the rotor and drive train, and other equipment including controls, electrical cables, and other interconnection and support equipment.

SUMMARY OF THE INVENTION

In general, this disclosure describes devices, systems, and techniques for measuring tension in a guide wire that is attached to a tower service lift in a wind turbine generator tower. In some examples described herein, a guide wire tension assembly is configured to capture continuity characteristics and/or determine whether the tension in the guide wire meets a predetermined threshold.

In one example, a system is configured to detect guide wire tension. The system includes a wind turbine generator tower, a rigging, a drive mechanism, a lift, a guide wire, a tension system spring, and a tension loss sensor. The rigging is mounted to an interior portion of the wind turbine generator tower. The rigging is configured to be movable in a substantially vertical direction along the interior portion of the wind turbine generator tower. The drive mechanism is mechanically connected to the rigging and mounted to an upper portion of the wind turbine generator tower. The drive mechanism is operable to move the rigging in a substantially vertical direction. The lift is mechanically connected to the rigging. The movement of the drive mechanism is operable to actuate the lift to be raised or lowered in a substantially vertical direction along the interior portion of the wind turbine generator tower. The guide wire is mounted to a lower portion of the wind turbine generator tower and mechanically connected to the lift. The tension system spring is mechanically connected to the guide wire and mounted to the lower portion of the wind turbine generator tower. The tension system spring is configured to maintain tension during movement of the lift or movement of the wind turbine generator tower. The tension loss sensor is connected to the guide wire. The tension loss sensor is configured to detect movement of the tension system spring.

In one example, a system is configured to detect guide wire tension. The system includes a wind turbine generator tower, a rigging, a drive mechanism, a lift, a guide wire, a tension system spring, and a tension loss sensor. The rigging is mounted to an interior portion of the tower. The rigging is configured to be movable in a substantially vertical direction along the interior portion of the tower. The drive mechanism is mechanically connected to the rigging and mounted to an upper portion of the tower. The drive mechanism moves the rigging in a substantially vertical direction. The lift is mechanically connected to the rigging. The movement of the drive mechanism actuates the lift to be raised or lowered in a substantially vertical direction along the interior portion of the tower. The guide wire is mounted to a lower portion of the tower and mechanically connected to the lift. The tension system spring is mechanically connected to the guide wire and mounted to the lower portion of the tower. The tension system spring is configured to maintain tension when the lift moves in a substantially vertical direction or the tower sways and moves in the wind. The tension loss sensor is connected to the guide wire. The tension loss sensor is configured to detect movement of the tension system spring.

In another example, a tension sensor device is adapted to be installed in a basement of a wind turbine generator tower. The tension sensor device is adapted to sense tension in a guide wire that is mechanically connected to a lift. The tension sensor device is adapted to transmit a tension state signal to a central monitoring system.

In another example, the disclosure includes a method comprising measuring continuity in an unconfined area of a wind turbine generator tower. The continuity is configured to represent a state of one or more contacts in a tension loss sensor. The state of the one or more contacts is configured to represent tension in a guide wire that is connected to a lift in the wind turbine generator tower. The method includes determining that the tension exceeds a predetermined threshold.

The details of one or more examples are set forth in the accompanying drawings and the description below. Other features, objects, and advantages of the disclosed examples will be apparent from the description and drawings, and from the claims.

BRIEF DESCRIPTION OF THE DRAWINGS

The foregoing summary, as well as the following detailed description of various examples, is better understood when read in conjunction with the appended drawings. For the purposes of illustration, specific examples were selected to be shown; however, the present disclosure is not limited to the specific methods and instrumentalities disclosed. In the drawings.

DETAILED DESCRIPTION OF ILLUSTRATIVE EXAMPLES

Wind turbines are complex machines that require routine maintenance to sustain efficient and safe operation. Because wind turbines have blades that rotate in the wind, there are many parts that move and require routine maintenance. Most maintenance involves inspection of the wind turbine ("turbine") and wind turbine generator tower ("tower"). To perform this maintenance, technicians must typically ascend the tower to perform inspection and maintenance tasks at various points along the tower. Technicians must also access areas that are difficult to reach such as the basement. Many towers reach over 300 feet in height. Because of the vast height of these towers, many towers are now equipped with tower service lifts to safely transport personnel and materials as they ascend and descend to various locations on the tower.

The towers often include tower service lifts ("TSL"). TSLs are similar to traction elevators in that they include a rigging and guide wires to lift and lower the TSL and to guide the TSL's path, respectively. However, it should be noted that TSLs are not limited to traction elevators: A TSL may refer to any type of elevator including but not limited to hydraulic elevators, traction-hydraulic elevators, and climbing elevators.

Before using a TSL, manufacturers typically require a safety inspection. The inspection includes checking guide wire tension using a feeler gauge or other manual system. Before operating a TSL, inspection of the tension in the guide wires is often required to ensure that the TSL is safe to operate. Measuring tension in the guide wires often requires personnel to access confined spaces, oftentimes in the basement of the tower. Access to these confined spaces requires specialized procedures that sometimes must be performed by trained technicians. This situation makes the process of checking guide wire tension problematic. A solution that allows remote inspection of the guide wire tension would save time and money and improve lift operational life. It would be useful to allow personnel to inspect the tension from a less confined space.

Figure 1:
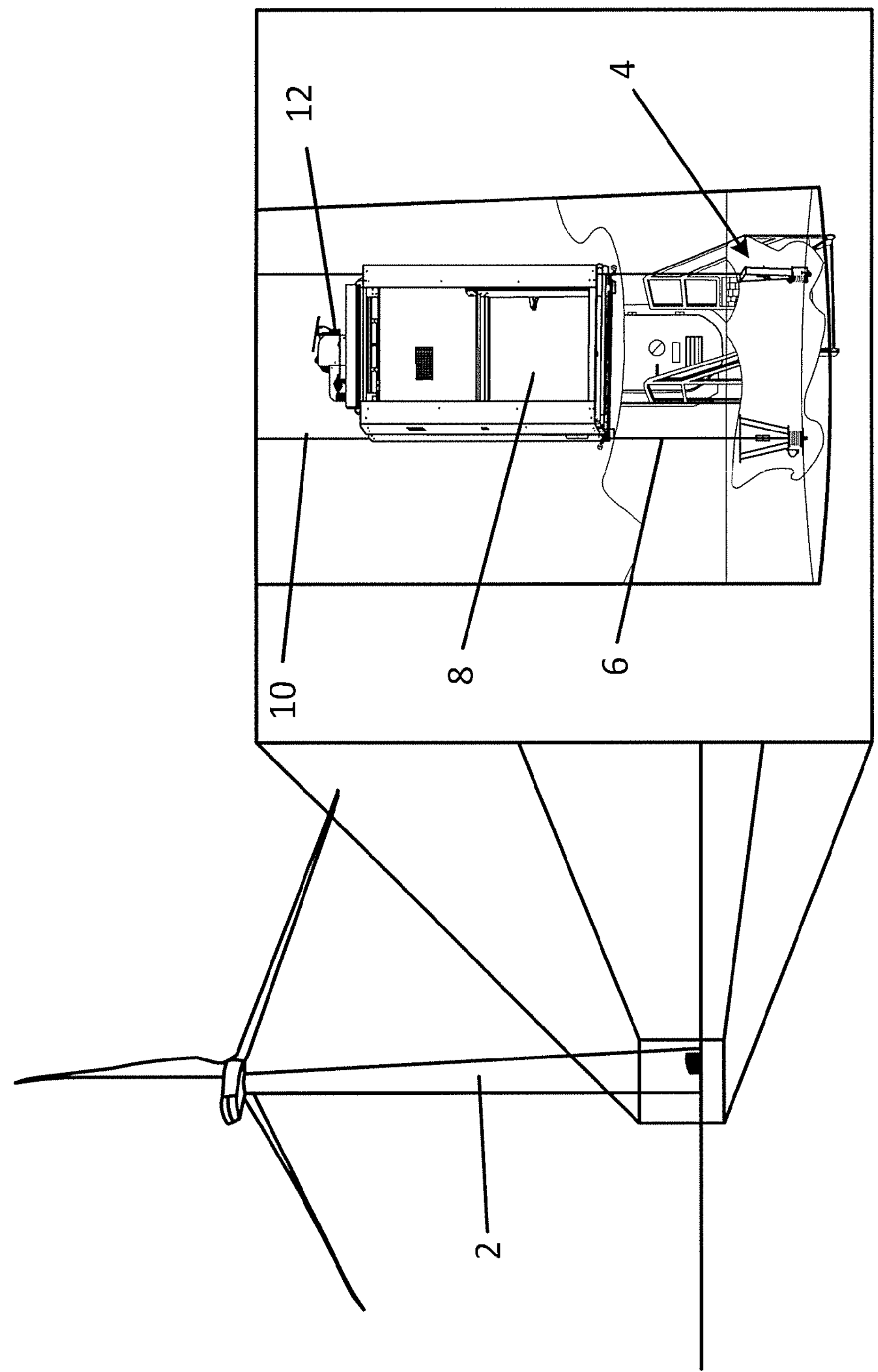
FIG. 1 shows a perspective view of a system for detecting guide wire tension in a wind turbine.

FIG. 1. is a perspective view of an example system for detecting guide wire tension including tower 2, guide wire tension assembly 4, guide wire 6, TSL 8, drive mechanism 12, and rigging 10. In FIG. 1, TSL 8 is elevated above ground level for illustration purposes only. In the example shown in FIG. 1, TSL 8 is configured to ascend tower 2 and also descend to the ground level. In other examples, TSL 8 is configured to descend to levels that are below the ground surface.

In the example shown in FIG. 1, tower 2 is a vertical structure that includes guide wire tension assembly 4, guide wire 6, TSL 8, rigging 10, and drive mechanism 12. A nacelle and generator are mechanically and electrically connected to an upper portion of tower 2, which allow two or more blades to take advantage of the best winds. The connections between guide wire tension assembly 4, guide wire 6, TSL 8, rigging 10, and drive mechanism 12 are further discussed below. Tower 2 may be constructed of any type of high-strength metal such as steel, carbon, aluminum, wood, or any other material, or any combination of materials. In yet another example, tower 2 may be a series of sections that are mounted together by flanges and bolts. In other examples, tower 2 may also be coated with any type of paint and/or sealant. Tower 2 may be any size diameter and height. In other examples, tower 2 is a different form factor other than the vertical structure illustrated in FIG. 1, such as one or more vertical towers that together form tower 2. In yet other examples, tower 2 may be an arch shape or a square shape form factor.

Guide wire tension assembly 4 is mechanically connected to guide wire 6 and mounted to a lower portion of tower 2. In one example, guide wire tension assembly 4 may be mounted in a confined space in tower 2. The confined space may include such areas as a basement or any space that requires specialized procedures and trained technicians to enter and subsequently inspect guide wire tension assembly 4. In one example, the system may include one guide wire tension assembly 4. In other examples, the system may include two or more guide wire tension assemblies. The number of guide wire tension assemblies may be dependent upon the size of tower 2, TSL 8, and drive mechanism 12. The number of guide wire tension assemblies may also depend upon the diameter of guide wire 6 and rigging 10.

In another example, guide wire tension assembly 4 may be mounted in a less restricted or unrestricted portion of tower 2, which includes both interior portions and exterior portions of tower 2. In other examples, guide wire tension assembly 4 may be mounted to an upper portion of tower 2. In yet another example, guide wire tension assembly 4 may be mounted to any location within the interior of tower 2.

In yet another example, guide wire tension assembly 4, guide wire 6, TSL 8, drive mechanism 12, and rigging 10 may all be mounted to an external portion of tower 2. In this example, the components may be constructed in a manner and of a material able to withstand extreme conditions in the elements, such as heat, sun, humidity, high winds, rain, snow, or any other inclement weather.

In one example, guide wire 6 may be mechanically connected to TSL 8. The mechanical connection at TSL 8 may include any various mechanical connections that are able to provide a mechanical advantage. Such connection options may include any of the following: pulleys, levers, gears, belts, chains, block and tackle, etc. In the example shown in FIG. 1, there are two guide wires that are mechanically connected to TSL 8. In other examples, there may be one guide wire. In other examples, there may be three or more guide wires. In yet another example, guide wire 6 may be mechanically connected to a governor device, which is intended to prevent TSL 8 from descending at excessive speeds. The governor device may employ one or more knurled rollers that lock TSL 8 during an excessive speed descent. Further, guide wire 6 may be mechanically connected to one, two, or any plurality of connection options as previously listed (i.e., pulleys, levers, gears, belts, chains, block and tackle, etc.). The number of mechanical connections may depend upon the number of guide wires, the diameter of guide wire 6, or the diameter of rigging 10. The number of connections may also depend upon the size of tower 2, guide wire tension assembly 4, TSL 8, and drive mechanism 12.

Guide wire 6 may be constructed of steel, carbon, or any other suitable high strength material. In one example, guide wire 6 is comprised of a plurality of wires that are twisted together to form a larger wire. In one example, the diameter of guide wire 6 is 11 mm. In another example, the diameter of guide wire 6 is 5/16 in. In other examples, guide wire 6 is of any diameter that exhibits suitable tension and wire rope strength necessary for tower service lift applications. Guide wire 6 may also be coated with any suitable material, such as zinc or any other coating material. In another example, guide wire 6 is galvanized. In yet another example, guide wire 6 is raw "bright" steel.

In another example, guide wire 6 may be a chain. The chain may be a series of linked torus-shaped pieces that form a chain. In another example, the chain may be a roller-chain, such as a bicycle chain that transfers power from the pedals to the sprocket(s) on the bicycle wheel. In this manner, guide wire 6 (as a roller chain) may be mechanically connected to TSL 8 by one or more sprockets or one or more gears. In any of these examples, that use a torus-shaped chain or a roller-chain, the chain may be any size chain to ensure safe operation of TSL 8.

In yet another example, guide wire 6 may be a rope that is constructed of any long, stringy, fibrous material. In other examples, guide wire 6 is constructed of natural or synthetic fiber. The natural fiber may be any form of manila hemp, hemp, linen, cotton, coir, jute, straw, silk, wool, hair, or sisal. The synthetic fiber may be polypropylene, nylon, polyester, polyethylene (e.g., Dyneema® and Spectra®), Aramid (e.g., Twaron®, Technora®, and Kevlar®) or acrylic (e.g., Dralon®). In another example, guide wire 6 may be constructed of mixtures of several fibers or use co-polymer fibers.

In FIG. 1, TSL 8 is mechanically connected to guide wire 6 and rigging 10. Drive mechanism 12 may be mounted on TSL 8. TSL 8 may be configured to ascend and descend any personnel and/or materials to any vertical or horizontal location on tower 2. Guide wire 6 and rigging 10 may actuate the movement and stability of TSL 8 during ascending and descending operations. Guide wire 6 and rigging 10 may be mechanically connected to TSL 8 at one or more locations. In one example, guide wire 6 and rigging 10 are connected to TSL 8 by one or more pulleys. In another example, guide wire 6 and rigging 10 are connected to TSL 8 by one or more gears. In yet another example, guide wire 6 and rigging 10 are connected to TSL 8 by one or more guide connections, whereby guide wire 6 and rigging 10 are wound through one or more guide connections that are mounted to a side of TSL 8. In one example, a quantity of two guide components are attached to each side of TSL 8, disposed towards a top and a bottom of TSL 8 to provide adequate stability. In this manner, guide wire 6 is under static tension and is configured to pass through the guide component, thereby constraining lateral movement of TSL 8.

In one example, TSL 8 may include one or more doors that open to allow personnel and materials to enter and exit. The doors also close to safely enclose personnel and materials during ascending and descending operations. In the example shown in FIG. 1, TSL 8 also includes a floor, ceiling, and surrounding walls that enclose TSL 8. TSL 8 may be constructed of any high-strength and reliable material, such as steel, aluminum, carbon, wood, or any other material, or any combination of materials.

Rigging 10 may be mounted to an interior portion of tower 2 and mechanically connected to TSL 8. Rigging 10 may be configured to be movable in a substantially vertical or horizontal direction along the interior portion of tower 2. In another example, rigging 10 is mounted to an exterior portion of tower 2, whereby rigging 10 is further configured to be movable in a substantially vertical or horizontal direction along the exterior portion of tower 2. Because tower 2 may take on different form factors, such as an arch, rigging 10 may also be configured to be movable in a substantially horizontal direction or any other direction along the interior portion of tower 2. Accordingly, because the movement of rigging 10 actuates the movement of TSL 8, TSL 8 may also be configured to be movable in a substantially vertical or horizontal direction along the interior portion of tower 2. In the example shown in FIG. 1, there are two riggings. In other examples, there may be one rigging. In yet other examples, there may be three or more riggings.

Rigging 10 may be constructed of steel, carbon, or any other suitable high strength material. In one example, rigging 10 is comprised of a plurality of wires that are twisted together to form a larger wire. In one example, the diameter of rigging 10 is 11 mm. In another example, the diameter of rigging 10 is 5/16 in. In other examples, rigging 10 is of any diameter that exhibits suitable tension and wire rope strength necessary for tower service lift applications. Rigging 10 may also be coated with any suitable material, such as zinc or any other coating material. In another example, rigging 10 is galvanized. In yet another example, rigging 10 is raw "bright" steel.

In another example, rigging 10 is a chain. The chain may be a series of linked torus-shaped pieces that form a chain. In another example, the chain is a roller-chain, such as a bicycle chain. In this manner, rigging 10 (as a roller-chain) may be mechanically connected to TSL 8 by one or more sprockets or one or more gears. In any of these examples that use a torus-shaped chain or a roller-chain, the chain may be any size chain to ensure safe operation of TSL 8.

In yet another example, rigging 10 is a rope that is constructed of any long, stringy, fibrous material. In other examples, rigging 10 is constructed of natural or synthetic fiber. The natural fiber may be any form of manila hemp, hemp, linen, cotton, coir, jute, straw, silk, wool, hair, or sisal. The synthetic fiber may be polypropylene, nylon, polyester, polyethylene (e.g., Dyneema® and Spectra®), Aramid (e.g., Twaron®, Technora®, and Kevlar®) or acrylic (e.g. Dralon®). In another example, rigging 10 may be constructed of mixtures of several fibers or use co-polymer fibers.

In the example shown in FIG. 1, drive mechanism 12 is operatively connected to rigging 10 and mounted to TSL 8. The drive mechanism actuates the movement of rigging 10. As described above, rigging 10 may be moveable in any direction; as such, drive mechanism 12 may be configured to accommodate movement in any direction as well. In one example, drive mechanism 12 is an AC electric motor. The AC electric motor may use single-phase or multi-phase AC power. The AC motor may be single-speed, two-speed, or variable-speed. In another example, drive mechanism 12 is a DC electric motor. Furthermore, the AC or DC electric motors may comprise any type of geared motor, right angle geared motor, or helical geared motor. In one example, the motor is any type of three-phase AC motor with any voltage—such as 230V, 400V, or 690V. In another example, the motor is an air motor.

Figure 2:
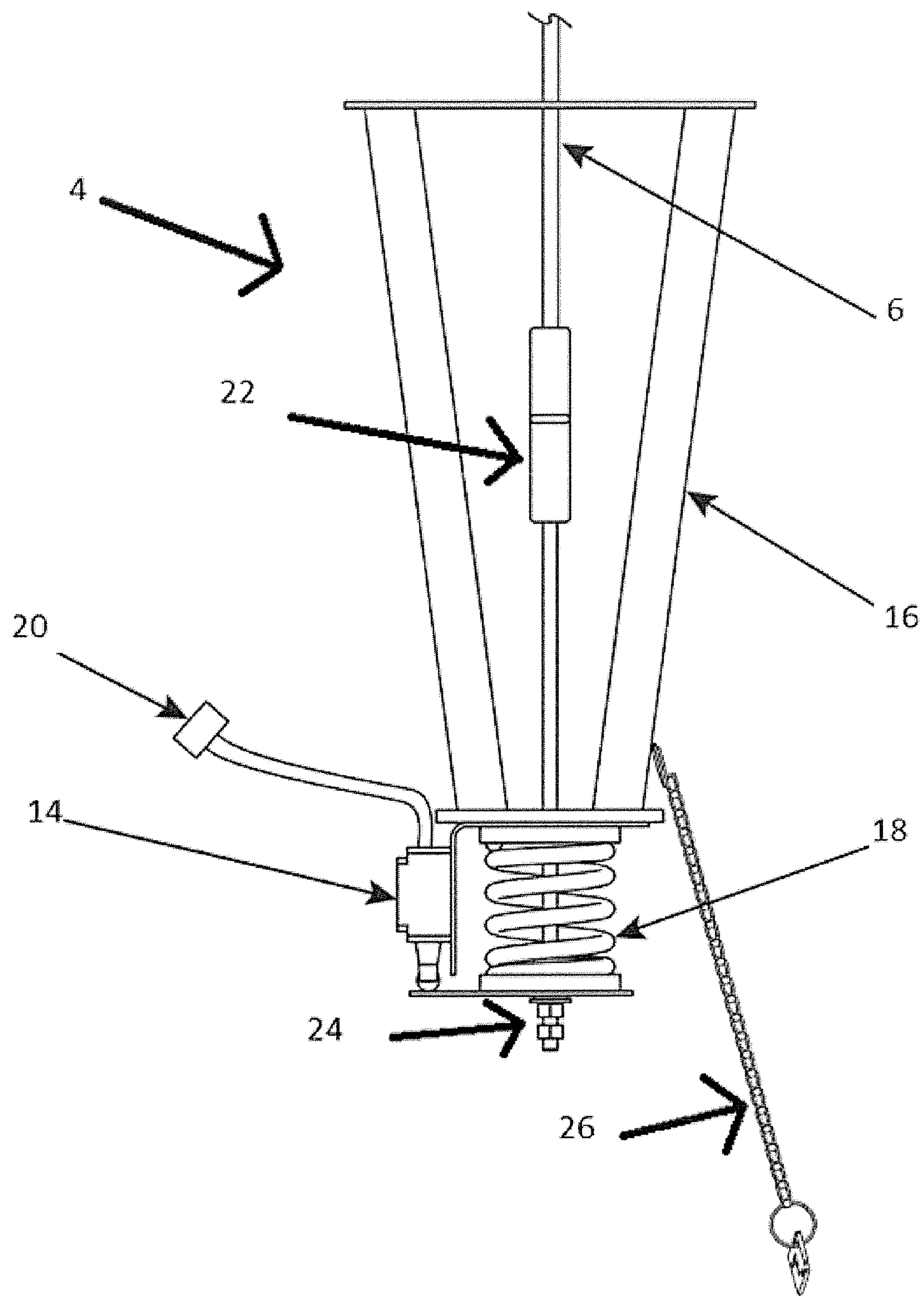
FIG. 2 shows a side view of a guide wire, a tension system spring, and a tension loss sensor.

FIG. 2 is a side view of guide wire tension assembly 4. Guide wire tension assembly 4 further includes tension loss sensor 14, tension system support 16, tension system spring 18, continuity plug 20, wire rope termination device 22, nut and jam nut 24, and back-up tension measuring device 26.

Tension loss sensor 14 is electrically connected to continuity plug 20 and mechanically connected to one or more plates that are disposed proximal to nut and jam nut 24. Tension loss sensor 14 operates by detecting stress that is transmitted through guide wire 6, which is transmitted through tension system spring 18. The stress, or tension, is created by the opposing upward or downward force of TSL 8 by rigging 10 of FIG. 1 on guide wire 6 and in turn tension system spring 18. In the event that an opposing upward force is lost or decreased, tension loss sensor 14 will detect this change in tension and may indicate this as being a tension that does not meet a predetermined threshold. However, tension loss sensor 14 may detect tension at all times, including times of increased, decreased, or constant tension. In other examples, tension loss sensor 14 is configured to indicate any tension above or below a predetermined threshold.

In one example, tension loss sensor 14 is configured to detect 3/16 in. of movement in guide wire 6. Furthermore, tension system spring 18 may be configured to move 3/16 in. when tension in guide wire 6 increases or decreases by 50 lbs. In other examples, tension system spring 18 is configured to move any distance when tension in guide wire 6 increases or decreases by 50 lbs. In one scenario, a 4 in. compression in tension system spring 18 indicates about 880 lbs. of tension force in guide wire 6. In other examples, tension system spring 18 is configured to compress by any other distance and correspondingly indicate any other tension force above or below 880 lbs. In another example, the tolerance range of tension loss sensor 14 is calibrated to indicate tension system spring 18 compressions between 4 in. and 4 3/16 in. As such, the tension system spring compression of 4 in. to 4 3/16 in. may be the predetermined threshold. Accordingly, any compression outside of 4 in. to 4 3/16 in. may indicate that tension does not meet the predetermined threshold. In other examples, the compression range may be set to any narrower or wider range. In one example, the predetermined threshold covers tension system spring compression from 4 in. to 5 in. In another example, the range is more narrow—4 in. to 4 1/4 in. In other examples, the predetermined threshold covers any tension system spring compression range that TSL 8 may experience.

Tension loss sensor 14 may comprise a variety of sensor types. In one example, the sensor is a limit switch. The limit switch may operate by the tension in guide wire 6 and tension system spring 18, which is detected by the limit switch as motion. The limit switch may be any standard type of limit switch, such as a wand, lever, roller plunger, or whisker type. In this example, the limit switch detects the motion, or tension, by the actuation of the wand or plunger, which is mounted on one side of the limit switch. The movement of the wand or plunger in turn actuates a set of contacts, which are detected as continuity. In one example, the contacts are normally open, and if no continuity is detected, a loss in tension in the guide wire may be indicated—which in one example may be interpreted as not meeting a predetermined threshold. In another example, the contacts are normally closed, and if no continuity is detected, tension in the guide wire may be indicated—which in one example may be interpreted as meeting a predetermined threshold.

In another example, tension loss sensor 14 may be an analog sensor. In this example, the analog sensor produces an output. In the analog sensor, the plunger or wand may actuate an electronic device that varies the output from 0 to 5 volts, 0 to 12 volts, or alternatively any voltage range. In this manner, if the voltage does not meet a predetermined threshold value, this may be interpreted as unsafe tension. Accordingly, if the voltage meets the predetermined threshold value, this may be interpreted as safe tension. In another example, a voltage that does not meet the predetermined threshold value indicates safe tension; while a voltage that does meet the predetermined threshold indicates unsafe tension. In another example, the output signal can be processed to determine the actual tension value and then report that value to an operator via a digital screen or read-out. In yet other examples, tension loss sensor 14 may be an ultrasonic, infrared, or optical sensor. These sensor types may operate by sending out electromagnetic radiation at some wavelength whereby the signal bounces back when it encounters a target. In this example, the signal could either be processed digital to open a contact or processed analog to vary the output similar to the voltage ranges described above (0 to 5 volts, 0 to 12 volts, or any voltage range). Tension system support 16 is mechanically connected to tension system spring 18 and guide wire 6. Tension system support 16 may be rigidly connected to guide wire 6 and tension system spring 18. This rigid connection may act to transmit tension from guide wire 6 to tension system spring 18. Tension system support 16 may also serve to provide additional structural support to guide wire tension assembly 4. Additionally, tension system support 16 may also serve as a protective device so that outside objects do not intrude and potentially cause damage to any components within guide wire tension assembly 4. Tension system support 16 may be constructed of any suitable materials, including any high strength alloy such as steel or titanium. In another example, tension system support 16 may be constructed of a lightweight alloy such as aluminum. In yet another example, tension system support 16 may be constructed of a material comprised of carbon nanotubes.

In the example shown in FIG. 2, the assembly also includes a tension system spring 18. Tension system spring 18 is mechanically connected to tension system support 16 and nut and jam nut 24. It should be noted that nut and jam nut 24 may also include a plate that acts as a mating interface between tension system spring 18 and nut and jam nut 24. Tension system spring 18 is intended to provide flexibility to guide wire 6 so that as the tension on guide wire 6 changes, the tension system spring 18 will flex thereby allowing guide wire 6 to accommodate the change in load without placing too much stress on guide wire 6 thereby preventing breakage in guide wire 6. Additionally, the flexing, or movement, in tension system spring 18 may actuate in to movement of tension loss sensor 14. In doing so, tension loss sensor 14 is able to detect tension by the movement of tension system spring 18. Tension system spring 18 may be a coil spring (also known as a helical spring), which may be constructed of any commercially available material commonly used in coil springs. This material may include any steel alloy including high-carbon, low-carbon, chrome, or stainless steel.

Guide wire tension assembly 4 may also include continuity plug 20. Continuity plug 20 is electrically connected to tension loss sensor 14. The electrical connection between continuity plug 20 and tension loss sensor 14 may be achieved by the use of a wired connection or a wireless connection. Continuity plug 20 acts as an electrical interface whereby a technician may connect a continuity test device to the assembly to measure mechanical tension. Continuity plug 20 may be any commercially available continuity plug type, such as a coaxial cable mating plug. Continuity plug 20 may be any female or male plug type. For example, the continuity plug can be a terminal strip, bus bar, or any other commercially available connector or specially designed electrical termination. As long as continuity plug 20 is able to connect with a continuity test device, then any type of continuity plug may be used in the assembly.

In one example, continuity plug 20 is physically located within a confined space, such as a basement of tower 2 (as shown in FIG. 1). In another example, continuity plug 20 is located outside the confined space so that the technician has easy access to connect the continuity test device to continuity plug 20. In one example, continuity plug 20 is physically located outside tower 2. In another example, continuity plug 20 is located within another interior portion of tower 2 that is less confined than the basement space. Additionally, by locating continuity plug 20 outside the confined space, this decreases the need for specialized procedures and trained personnel to measure continuity; consequently, this greatly increases accessibility to continuity plug 20. In yet another example, continuity plug 20 is located in an exterior space adjacent to tower 2. In yet a further example, continuity plug 20 is located in an exterior space distal location to tower 2.

Wire rope termination device 22 is mechanically connected to guide wire 6 on one end and mechanically connected to nut and jam nut 24 at the other end. In another example, wire rope termination device 22 is mounted to a lower portion of tower 2, such as a concrete slab at the base of tower 2. In another example, wire rope termination device 22 is mounted to a metal plate that sits at the base of tower 2. In one example, the purpose of wire rope termination device 22 is to serve as an anchor to hold guide wire 6 in place. Guide wire 6 is mounted to wire rope termination device 22 via a wire rope wedge socket, which is a device commonly used in elevators for terminating wire ropes at a "close enough" length. In another example, the connection could also be a wire rope terminated with a thimble and swaged clamps, or a swaged purpose built fitting. In yet another example, guide wire 6 may be mounted to wire rope termination device 22 via a welded connection. In turn, wire rope termination device 22 may be anchored to tower 2 via threaded connection that is mounted in the concrete or metal base of tower 2. In other examples, wire rope termination device 22 may be mounted to tower 2 via a weld, rivets, or any other suitable anchoring system.

The purpose of wire rope termination device 22 is to not only anchor guide wire 6, but also to transmit the tension from guide wire 6 to tension system spring 18 and tension loss sensor 14—which is then detected by a technician that attaches a continuity test device to continuity plug 20. Wire rope termination device 22 may be constructed of any suitable high strength alloy such as steel or titanium. In another example, tension system support 16 may be constructed of a lightweight alloy such as aluminum. In another example, tension system support 16 is constructed of magnesium casting. In yet other examples, tension system support 16 is constructed of glass reinforced injection molded nylon, rotationally molded plastic, or any other plastic material. In yet another example, tension system spring 16 is constructed of a material comprised of carbon nanotubes.

The example shown in FIG. 2 also includes nut and jam nut 24. Nut and jam nut 24 is a threaded assembly that is mechanically connected to wire rope termination device 22. Nut and jam nut 24 is used to tension guide wire 6 by pulling on the wire rope termination device 22. In one example, nut and jam nut 24 may be a simple tension nut and jam nut. In another example, nut and jam nut 24 is a ball screw. In other examples, nut and jam nut 24 may be a wedge block system or come along system. Nut and jam nut 24 may be constructed of any suitable high strength material, such as steel.

Furthermore, the example shown in FIG. 2 also includes back-up tension measuring device 26. Back-up tension measuring device 26 is mechanically connected to tension system support 16. Back-up tension measuring device 26 is a chain that contains a go/no-go gauge for manually checking tension. The gauge on back-up tension measuring device 26 is held vertically adjacent to tension system spring 18. When the go/no-go gauge fits in to the gap, tension meets a predetermined threshold. Contra, when the go/no-go gauge does not fit or there is a gap, tension does not meet a predetermined threshold. In another example, when the go/no-go gauge fits in to the gap, tension does not meet a predetermined threshold and when the go/no-go gauge does not fit or there is a gap, tension does meet a predetermined threshold. Back-up tension measuring device 26 may be constructed of any high strength alloy, such as steel or titanium. In another example, back up tension measuring device 26 may be constructed of a lightweight alloy such as aluminum. In other examples, back up tension measuring device 26 is constructed of any type of plastic, ceramic, wood, copper, or brass. In yet another example, back up tension measuring device 26 is constructed of a material comprised of carbon nanotubes.

Figure 3:
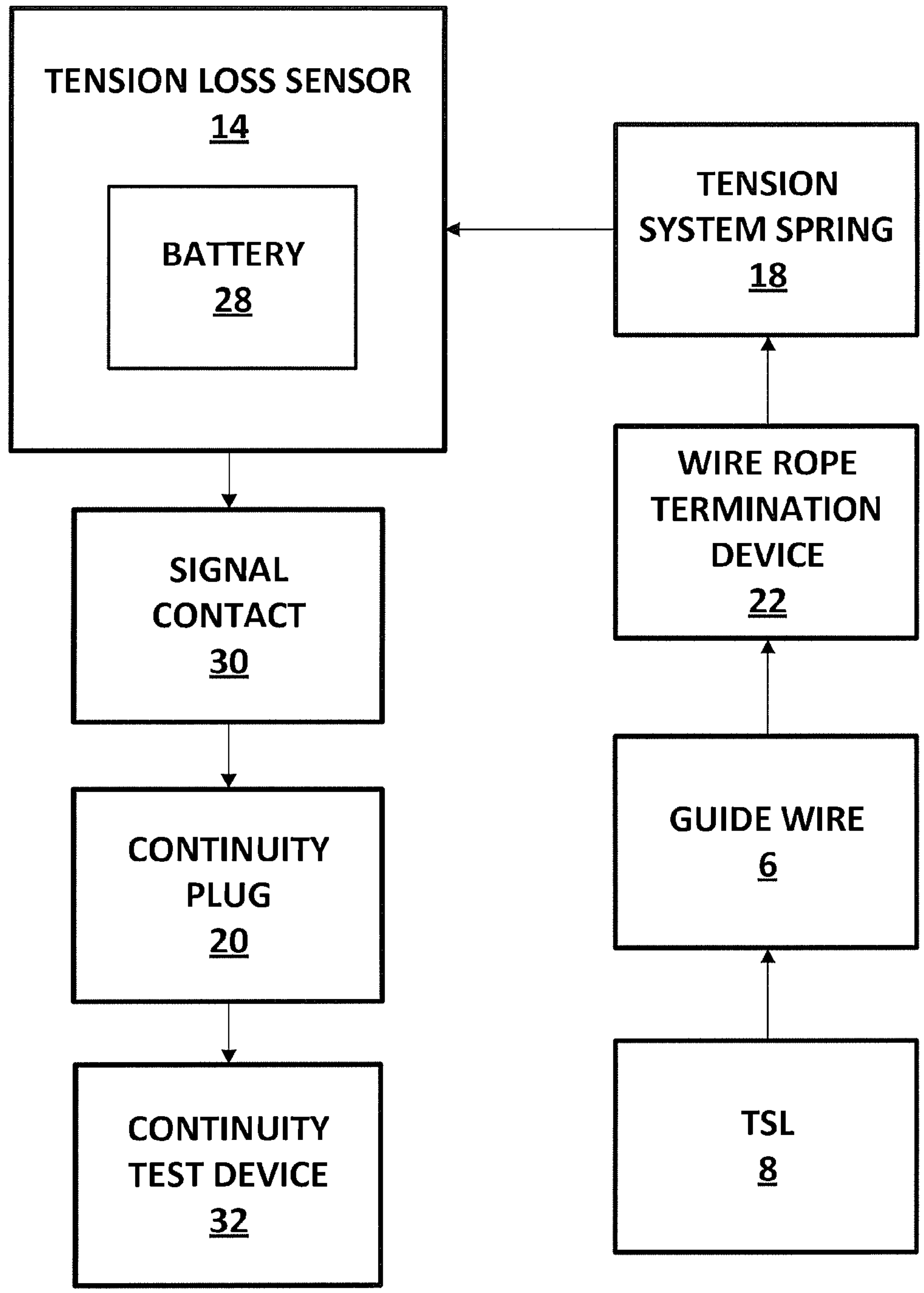
FIG. 3 shows a schematic diagram that illustrates mechanical, electrical, and logical connections between the components within a guide wire tension assembly and a guide wire and a tower service lift.

FIG. 3 is a schematic view of tension loss sensor 14, continuity plug 20, continuity test device 32, battery 28, tension system spring 18, wire rope termination device 22, and guide wire 6. In one example, such as the examples of FIG. 2, continuity plug 20 is located proximal, within the same confined space, to tension loss sensor. In another example, continuity plug 20 is arranged separate from tension loss sensor 14 and the components are communicatively connected. For clarity, the other components of guide wire tension assembly 4 and tower 2 (as shown in FIG. 1) have been removed in FIG. 3. As illustrated in FIG. 3, tension loss sensor 14 includes battery 28. FIG. 3 is intended to show how the various electrical, mechanical, and logical connections of the different components of guide wire tension assembly 4 work together. In other examples according to this disclosure, a guide wire tension assembly 4 may include fewer components. In such example, guide wire tension assembly 4 may not include continuity test device 32.

In FIG. 3, TSL 8, guide wire 6, wire rope termination device 22, tension system spring 18, and tension loss sensor 14 are mechanically connected. The mechanical connection of these components is intended to transmit the force of TSL 8 through the various connections so that it is ultimately detected by tension loss sensor 14. As such, tension loss sensor 14 is configured in such arrangement to detect tension from tension system spring 18, which is in turn configured to detect tension from wire rope termination device 22. Wire rope termination device 22 is configured to detect tension directly from guide wire 6, which is in turn configured to receive tension from TSL 8. It should be noted, that the word "detect" in this context can mean "receive," "transmit," or any other suitable word that represents a rigid mechanical connection between these components to transfer tension (or force) from one component directly to the next.

Tension loss sensor 14 is electrically connected to continuity plug 20. The electrical connection of tension loss sensor 14 to continuity plug 20 is configured so that continuity plug 20 receives electrical signals from tension loss sensor 14, which represent the amount of tension experienced by tension system spring 18. In one example, continuity plug 20 receives a continuity signal from tension loss sensor 14. In this manner, if there is continuity, this indicates that tension meets a predetermined threshold. If there is no continuity, this represents that tension does not meet a predetermined threshold. In another example, the opposite is true. In this manner, if there is continuity, the tension does not meet a predetermined threshold and alternatively, if there is no continuity, the tension meets a predetermined threshold. Tension loss sensor 14 is also electrically connected to battery 28, so that tension loss sensor 14 may draw any necessary power, to continuously detect tension. Aside from tension loss sensor 14, battery 28 may also power any other component, including continuity test device 32, which will be discussed in more detail later.

In the example illustrated in FIG. 3, tension loss sensor 14 is electrically connected to signal contact 30, which in turn is electrically connected to continuity plug 20, which in turn is electrically connected to continuity test device 32. Continuity plug 20 is intended to serve as an electrical interface whereby a technician may initiate an electrical/logical connection with tension loss sensor 14 to detect the amount of tension. The technician initiates the connection by electrically connecting continuity test device 32 to continuity plug 20. This electrical connection may be accomplished via a wired electrical connection or a wireless electrical connection. In another example, there is no continuity plug 20 in the system. In yet another example, the system includes continuity plug 20, but continuity plug 20 is not required to initiate an electrical connection with tension loss sensor 14. In this manner, a technician may establish an electrical connection wirelessly with tension loss sensor 14 using continuity test device 32 at any remote location. The wireless connection may be accomplished via the Internet, telemetry, ZigBee®, Bluetooth®, radio frequency, ultrasonic, cellular, or any form of electromagnetic radiation. The system is not limited to these wireless connections discussed herein—any wireless connection may be used. In another example, the technician initiates an electrical connection using continuity test device 32 and any of the methods previously described with tension loss sensor 14 at tower 2.

In the example shown in FIG. 3, the system includes battery 28. In other examples, there is no battery. In other examples the battery may be connected within the system at any other location than that shown in FIG. 3. In this manner, battery 28 may be connected to continuity plug 20, continuity test device 32, or any electrical component not disclosed herein. In the example where battery 28 is connected to continuity test device 32, battery 28 may also power tension loss sensor 14. In this manner, tension loss sensor 14 is essentially powered off until it establishes a connection with continuity test device 32, at which point battery 28 serves to power both continuity test device 32 and tension loss sensor 14. In other examples, there is no battery and the system is powered by an alternate energy source, such as the electricity that is generated by a wind turbine, -solar energy, or any other fuel or energy source.

In the example shown in FIG. 3, the system also includes signal contact 30. Signal contact 30 is electrically connected to tension loss sensor 14 and continuity plug 20. In other examples, there is one signal contact. In other examples, there are two signal contacts. In yet other examples, there are three or more signal contacts. The signal contacts may be configured as normally open or normally closed. In this manner, a normally open signal contact that represents that there is no continuity indicates that tension does not meet a predetermined threshold (e.g., there is a loss of tension in the guide wire). Accordingly, a normally closed signal contact that represents that there is no continuity, indicates that tension meets a predetermined threshold (e.g., there is tension in the guide wire). In another example, the normally open and normally closed contacts are reversed. In this scenario, the normally open contact that represents that there is no continuity indicates that tension meets a predetermined threshold. Furthermore, the normally closed contact that represents that there is no continuity indicates that tension does not meet a predetermined threshold.

In another example, not shown in FIG. 3, there is also a processor electrically connected to tension loss sensor 14 or any other electrical component within the system. In this example, the processor may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The processor may be configured to carry out the instructions of a computer program and/or sequences of instructions to perform arithmetical, logical, and/or input and output operations. In this manner, the processor may instruct tension loss sensor 14 to perform various operations. For example, the processor may instruct tension loss sensor 14 to power up or power down. It may also instruct tension loss sensor 14 to perform a calibration. The processor may also instruct tension loss sensor to detect tension at any time interval. The processor may instruct tension loss sensor 14 and continuity test device 32 to establish a wired or wireless connection, whereby tension loss sensor 14 transmits tension information to continuity test device 32, and whereby continuity test device 32 further transmits the tension information to any other source outside of the system. For example, the tension information may be sent to an outside source in the form of a text message, an email, a telephone call, through a social media platform, or any other communicative method.

Although not disclosed in FIG. 3, the system may also include memory. The memory may be electrically connected to tension loss sensor 14, continuity plug 20, continuity test device 32, battery 28, or any other processor not disclosed in FIG. 3. The memory may be implemented as flash memory, random access memory (RAM), or any other type of volatile or non-volatile memory that stores data. In one example, memory is configured to store one or more characteristics, such as continuity information or tension data. Memory may also store programs and/or sequences of instructions for execution by any processor not disclosed and/or for controlling tension loss sensor 14, battery 28, or continuity test device 32. In one example, the memory contains programs and/or sequences of instructions that instruct tension loss sensor 14, continuity test device 32, to perform various operations. The memory may be pre-loaded with programs and/or instructions. The memory may also be configured to wirelessly transmit and receive programs and/or instructions to/from a remote location. In this manner, the memory may be updated with new programs and/or instructions at any time before or after the system is installed and is in operation.

Figure 4:
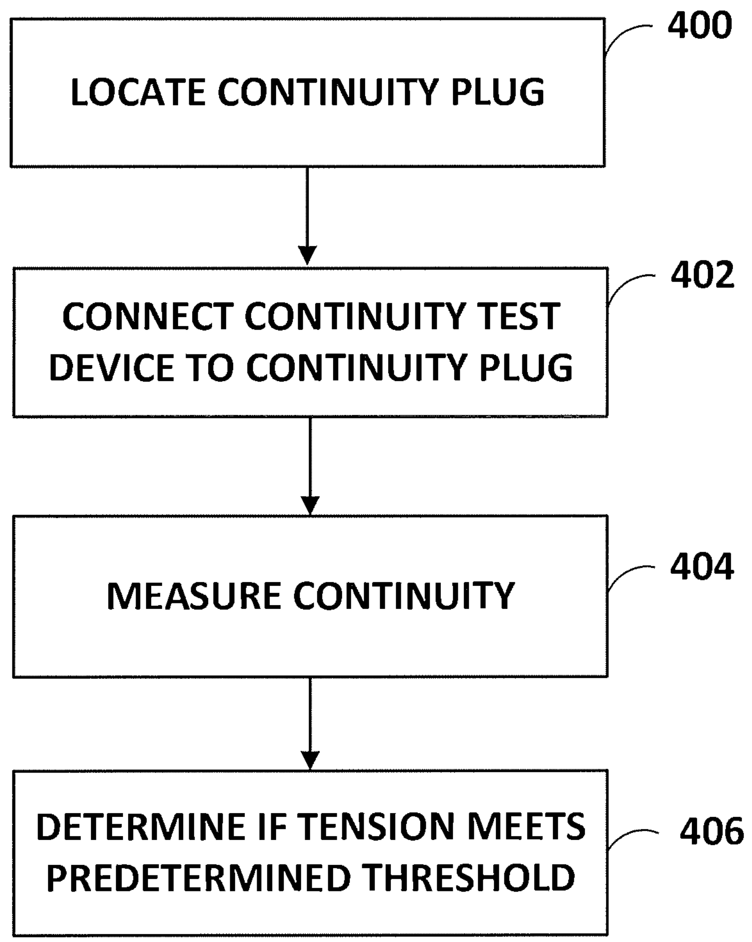
FIG. 4 shows a flow chart that illustrates a method for measuring continuity and determining whether the continuity corresponds to a tension that meets a predetermined threshold.

FIG. 4 is a flow chart illustrating a high-level example method of detecting whether tension meets a predetermined threshold. In the method of FIG. 4, operation 400 illustrates that a technician locates the continuity plug. It should be noted that in other examples where there is no continuity plug 20, this operation may be unnecessary. Continuity plug 20 may be located within the confined basement space or any other location inside or outside tower 2. For example, continuity plug 20 may be located at a convenient location whereby a technician is able to locate continuity plug 20 without entering any restricted space. As such, this reduces the need for specialized training and personnel to retrieve the tension data; basically anyone with a continuity test device 32 could retrieve tension data.

The continuity test device 32 may be electrically connected to continuity plug 20. Again, in the example where there is no continuity plug 20, this step becomes unnecessary. However, in the example method shown in FIG. 4, continuity test device 32 is electrically connected directly to continuity plug 20, thereby establishing an electrical connection between continuity test device 32 and tension loss sensor 14. In this manner, continuity test device 32 is able to retrieve tension data from tension loss sensor 14.

In other examples, continuity plug 20 may be electrically connected to one or more contacts, and the contacts may be electrically connected to tension loss sensor 14. An electrical state of the contacts may be configured to represent continuity and the state of the contacts depends upon tension in guide wire 6. In other examples, the method may also include connecting a continuity test device to the continuity plug. In yet other examples, the method may include determining if the tension in the guide wire meets a predetermined level.

In another example, operations 400 and 402 may be omitted. In this manner, the method may consist of operations 404 and 406.

When a wired or wireless connection is established between continuity test device 32 and continuity plug 20 and/or tension loss sensor 14, continuity test device 32 may then measure continuity as shown in operation 404). The technician may interpret this continuity data or, alternatively, the information may be recorded manually or electronically, or the technician may transmit the continuity data to another location to be interpreted.

Based on the continuity reading, a determination may be made as to whether tension meets a predetermined threshold (operation 406). For example, the continuity data may be interpreted as a tension that does not meet a predetermined threshold. Additionally, the continuity data may be interpreted as a tension that meets a predetermined threshold. Tension not meeting a predetermined threshold may indicate that TSL 8 is descending uncontrollably or there is a compromised state in guide wire 6. A compromised state in guide wire 6 may mean that guide wire 6 is broken or fatigued and in need of repair. Tension meeting a predetermined threshold may indicate that guide wire 6 and TSL 8 are operating as per manufacturer guidelines and thus safe to use.

Figure 5:
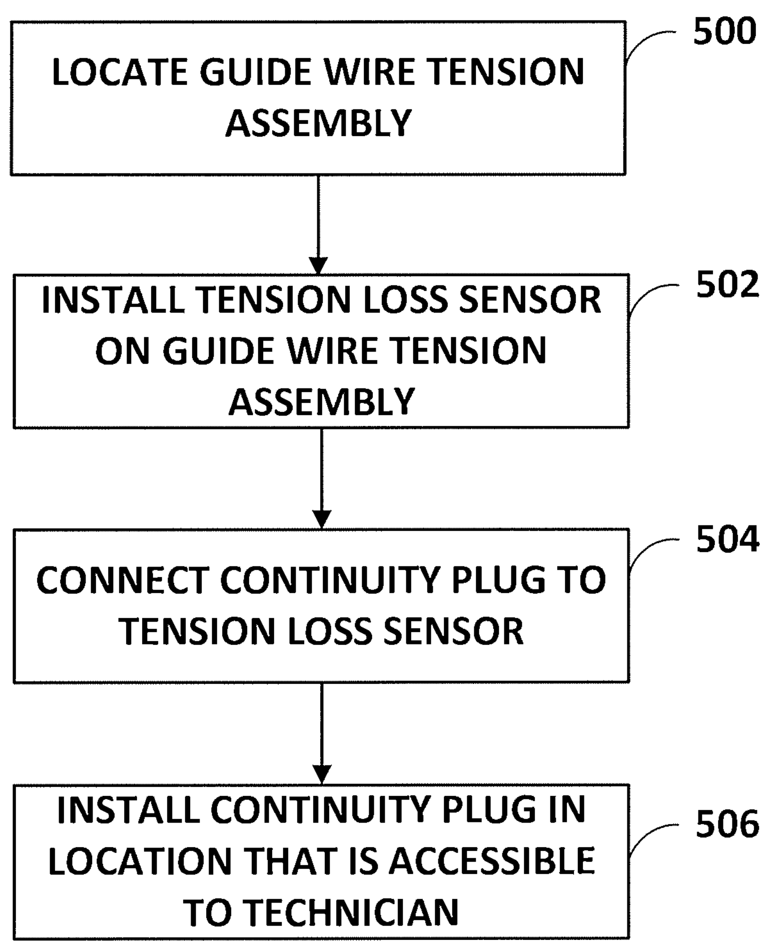
FIG. 5 shows a flow chart that illustrates a method for installing a system for detecting tension in a guide wire of a wind turbine tower service lift.

The method shown in FIG. 5 is intended to instruct a technician how to install tension loss sensor 14. The technician or personnel locates guide wire tension assembly 4 (operation 500). Guide wire tension assembly 4 may be located in a confined space, such as the basement, of tower 2, or it may be located in an unconfined space, whereby untrained personnel may enter the space.

When guide wire tension assembly 4 has been located, tension loss sensor 14 may be installed on guide wire tension assembly 4 (operation 502). In this example, tension loss sensor 14 may be installed anywhere on guide wire tension assembly 4 so as to measure tension in the system. For example, tension loss sensor 14 may be installed directly on tension system spring 18 or at any location proximal or adjacent to tension system spring 18. In another example, tension loss sensor 14 may be installed directly on guide wire 6 or wire rope termination device 22. In this manner, tension loss sensor 14 may take on various forms to detect tension. For example, tension loss sensor 14 may be a heat sensor that measures heat generated by guide wire 6 or wire rope termination device 22. In yet another example, tension loss sensor 14 is installed on tension system support 16. In still another example, tension loss sensor 14 is installed between nut and jam nut 24 and a plate that is adjacent to nut and jam nut 24. In this manner, tension loss sensor 14 measures the amount of compression in the system.

Continuity plug 20 may be connected to tension loss sensor 14 (operation 504). In this manner, a technician or other personnel may electrically connect to tension loss sensor 14 and signal contact 30 once the installation is complete. In another example, this step is optional because there is no continuity plug 20 in the system. For example, an alternate component may be connected to tension loss sensor 14 and signal contact 30 instead of continuity plug 20, such as a router or any other device that transmits radio signals. In yet another example, both continuity plug 20 and a router or any other device that transmits radio signals may be connected to tension loss sensor 14. In this manner, a wired or wireless may be connected to tension loss sensor 14 and/or signal contact 30.

Once continuity plug 20 is connected to tension loss sensor 14, continuity plug 20 is then installed in a location that is accessible to technician (operation 506). The technician may be any trained or untrained personnel for entering confined spaces in tower 2. As such, continuity plug 20 may be installed in a confined space or in an unconfined space. The unconfined space may be any space located on the interior or exterior of tower 2. In this manner, it is conceivable that any untrained personnel could access continuity plug 20 to retrieve continuity information and tension data. Alternatively, the confined space may include any tight space such as a basement, whereby strict procedures and trained personnel are only allowed to enter. In short, continuity plug 20 may be located in any location. For example, continuity plug 20 may be wirelessly connected to tension loss sensor 14 at a remote location. In this manner, a wired continuity test device 32 would still be able to remotely access continuity information and tension data from tension loss sensor 14. Alternatively, continuity plug 20 may be located at a distant location from tower 2, but the connection between continuity plug 20 and tension loss sensor 14 would be established by any wired means, such as a coaxial cable, fiber optics cable, or any other cable that would allow for an electrical connection over a long distance.

Figure 6:
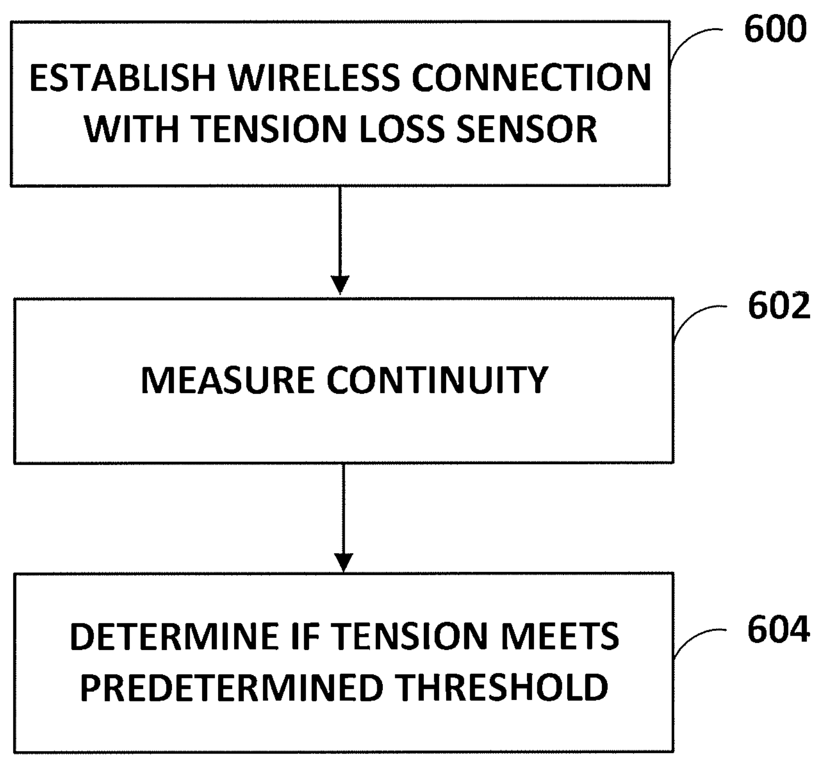
FIG. 6 shows a flow chart that illustrates a method for wirelessly connecting to a tension loss sensor, measuring continuity, and determining whether the continuity corresponds to a tension that meets a predetermined threshold.

FIG. 6 shows an example method for establishing a wireless connection with tension loss sensor. The wireless connection may be established by any form including cellular, radio frequency, infrared, wide area network, personal area network, local area network, and metropolitan area network. In this manner, a technician has wide accessibility using any wireless device at his or her disposal. Such devices may include a computer, cell phone, smart phone, tablet device, or even a mobile media streaming device, such as an Apple TV®, Roku®, or any other streaming media player.

When the wireless connection has been established, continuity may be measured (602). The continuity information may be a voltage range, for example 0 to 5 volts, 0 to 12 volts, or any other voltage range. In this manner, a device that measures voltage may be used to measure continuity. Alternatively, the continuity information may be a current, resistance, or impedance range. In this manner, a device that measures current, resistance, and/or impedance may be used to measure continuity.

A determination may be made whether tension meets a predetermined threshold (604). This determination may be made by interpreting the continuity information. In this manner, when a voltage value meets a predetermined threshold, the continuity information will then correspondingly indicate that the tension meets a predetermined threshold. For example, if the threshold value is 1 to 2 volts, in the range of 0 to 5 volts, any voltage measured below 1 volt will indicate that the tension does not meet the predetermined threshold. As such, any voltage above 2 volts will indicate that the tension does meet the predetermined threshold value. In a different example, a voltage that does not meet the threshold value may indicate that tension does meet the threshold value. In this manner, a voltage that does meet the threshold value may indicate that tension does not meet the threshold value.

In another example method that is not illustrated, the method includes locating guide wire tension assembly 4. The method may also include installing tension loss sensor 14 on guide wire tension assembly 4. In this example, tension loss sensor 14 may be electrically connected to one or more contacts. In this manner, a state of the contacts may be configured to represent continuity, and the state of the contacts may depend upon tension in guide wire 6 detected by tension loss sensor 14. The method may also include connecting continuity plug 20 to tension loss sensor 14. Continuity plug 20 may be electrically connected to tension loss sensor 14 and continuity plug 20 may be configured to electrically interface with a continuity test device. The method may include installing continuity plug 20 in a location that is accessible to a technician.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from or rearranged compared to the disclosed example examples.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example examples have been described, these examples have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system comprising:

a wind turbine generator tower;

a rigging mounted to an interior portion of the wind turbine generator tower, wherein the rigging is configured to be movable in a substantially vertical direction along the interior portion of the wind turbine generator tower;

a drive mechanism mechanically connected to the rigging and mounted to an upper portion of the wind turbine generator tower, wherein the drive mechanism is operable to move the rigging in a substantially vertical direction;

a lift mechanically connected to the rigging, wherein the movement of the drive mechanism is operable to actuate the lift to be raised or lowered in a substantially vertical direction along the interior portion of the wind turbine generator tower;

a guide wire mounted to a lower portion of the wind turbine generator tower and mechanically connected to the lift;

a tension system spring mechanically connected to the guide wire and mounted to the lower portion of the wind turbine generator tower, wherein the tension system spring is configured to maintain tension during movement of the lift or movement of the wind turbine generator tower;

a tension loss sensor connected to the guide wire, wherein the tension loss sensor is configured to detect movement of the tension system spring; and a continuity test device electrically connected to the tension loss sensor; and one or more contacts electrically connected to the tension loss sensor and the continuity test device, wherein the one or more contacts are configured to produce a signal that indicates a tension state.

2. The system of claim 1, further comprising a continuity plug.

3. The system of claim 1, wherein the tension loss sensor is located within an interior portion of the wind turbine generator tower, and wherein the tension loss sensor is located along a lower portion of the wind turbine generator tower.

4. The system of claim 1, wherein an open circuit indicates a loss of tension in the guide wire.

5. The system of claim 1 further comprising an indicator light electrically connected to the one or more contacts, wherein the indicator light is configured to illuminate when the guide wire is under tension.

6. The system of claim 1, wherein a loss of continuity indicates that the guide wire is under tension.

7. The system of claim 1, furthering comprising a central monitoring system, wherein the tension state is transmitted to a central monitoring system, and wherein the central monitoring system tracks maintenance requirements for the wind turbine generator tower.

8. The system of claim 7, wherein the central monitoring system is remotely located from the wind turbine generator tower.

9. The system of claim 7, wherein the central monitoring system is operable to transmit the tension state via telematics as an email or text message.

10. The system of claim 7, wherein the central monitoring system is located in an interior portion of the tower, and wherein the central monitoring system is configured to retrieve and store the tension state.

11. The system of claim 1, wherein the tension loss sensor is an analog sensor.

12. The system of claim 11, wherein the analog sensor is a strain gauge.

* * * * *